June 11, 1957 F. W. WITTE 2,795,449
SEALING DEVICE
Filed March 30, 1954 2 Sheets-Sheet 1
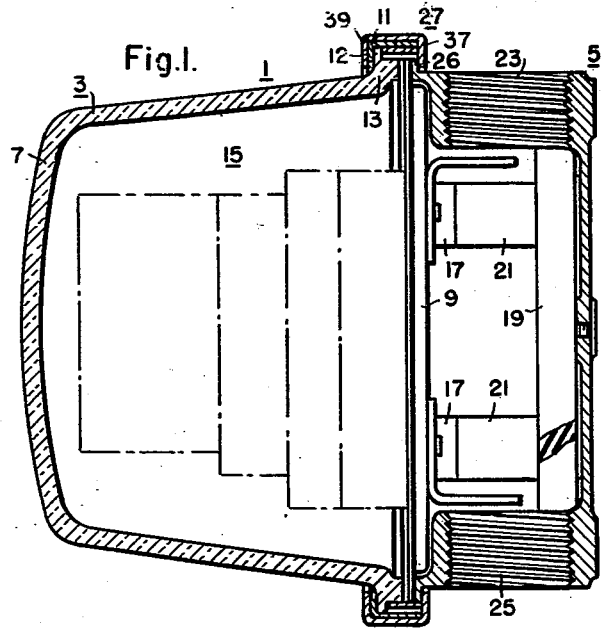
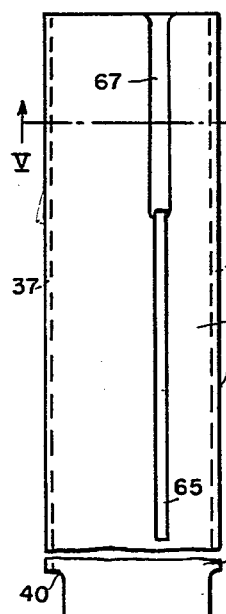
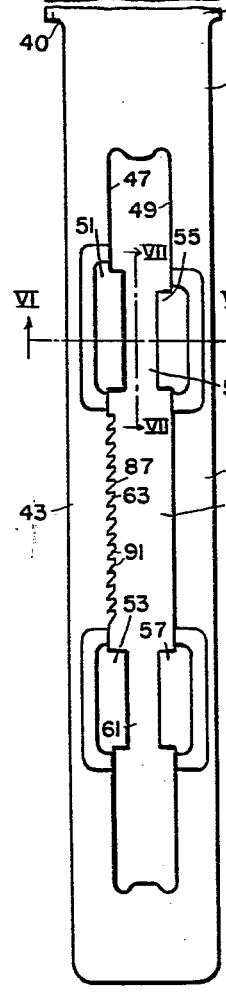
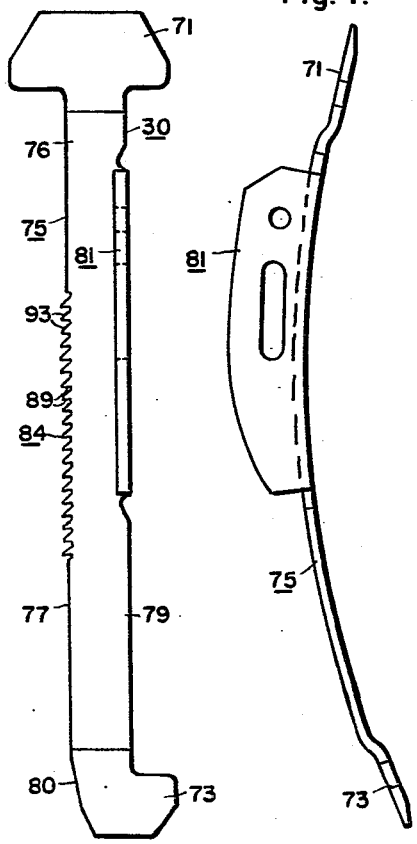
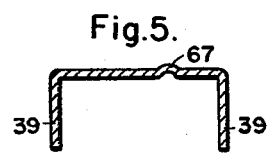
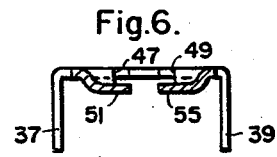
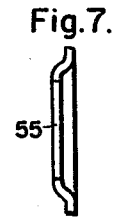
INVENTOR
Frederick W. Witte.
BY *C. L. Freedman*
ATTORNEY June 11, 1957   F. W. WITTE   2,795,449
SEALING DEVICE
Filed March 30, 1954   2 Sheets-Sheet 2

United States Patent Office 2,795,449
Patented June 11, 1957

2,795,449
SEALING DEVICE

Frederick W. Witte, Union, N. J., assignor to Westinghouse Electric Corporation, East Pittsburgh, Pa., a corporation of Pennsylvania Application March 30, 1954, Serial No. 419,756

14 Claims. (Cl. 292—256.65)

This invention relates to a sealing device and has particular relation to a sealing ring assembly for retaining the cooperating cover and socket receptacles of a detachable type meter assembly in an operative position relative to each other.

According to the invention, a sealing ring assembly is provided which includes two parts adapted for cooperating engagement. One of the parts comprises a flexible strip disposed in the form of a ring, and the other part is in the form of a locking member adapted to be secured to the flexible ring for movement relative thereto for adjusting the area enclosed by the flexible ring. The flexible ring and the locking part have cooperating portions effective to lock the ring assembly in a number of different adjusted positions of the ring assembly.

In a preferred embodiment of the invention, a resilient strip having a pair of ends is disposed in the form of a ring proportioned to surround the cover and socket receptacles of a detachable type meter assembly when such receptacles are in the attached position. Conveniently, the ring assembly is disposed to surround the meter assembly with the ends thereof overlapping radially of the ring assembly to provide an effective seal.

The ring assembly is provided with radial flanges spaced to provide a channel of the ring assembly proportioned to receive flanges of the cover and socket receptacles when such receptacles are in the attached position. By providing an adjustable ring assembly, a single ring assembly may be employed separately with a number of different size meter assemblies.

It is, therefore, an object of the invention to provide an improved sealing ring assembly.

It is another object of the invention to provide an improved sealing ring assembly of simple two-part construction with the parts being adapted for cooperating engagement.

It is a further object of the invention to provide an expansible and contractable sealing ring assembly including a flexible ring and a locking part secured to the flexible ring for movement relative to the flexible ring to vary the area enclosed by the ring assembly.

It is still another object of the invention to provide a sealing ring assembly including a flexible ring and a locking part secured to the flexible ring for automatically locking the ring assembly in a contracted position in response to contraction of the ring assembly about an object.

It is still another object of the invention to provide a sealing ring assembly as defined in the preceding paragraph wherein the locking part is releasable from a locking position in response to deformation of the flexible ring within the elastic limit thereof.

Other objects of the invention will be apparent from the following description taken in conjunction with the accompanying drawings; in which:

Figure 1 is a sectional view in side elevation of an electrical meter assembly of the detachable type embodying the invention;

Fig. 2 is a plan view of a part of the sealing ring assembly with parts broken away;

Fig. 3 is a plan view of another part of the sealing ring assembly;

Fig. 4 is a view in side elevation of the part of Fig. 3;

Fig. 5 is a view taken along the line V—V of Fig. 2;

Fig. 6 is a view taken along the line VI—VI of Fig. 2;

Fig. 7 is a view taken along the line VII—VII of Fig. 2;

Figure 8:
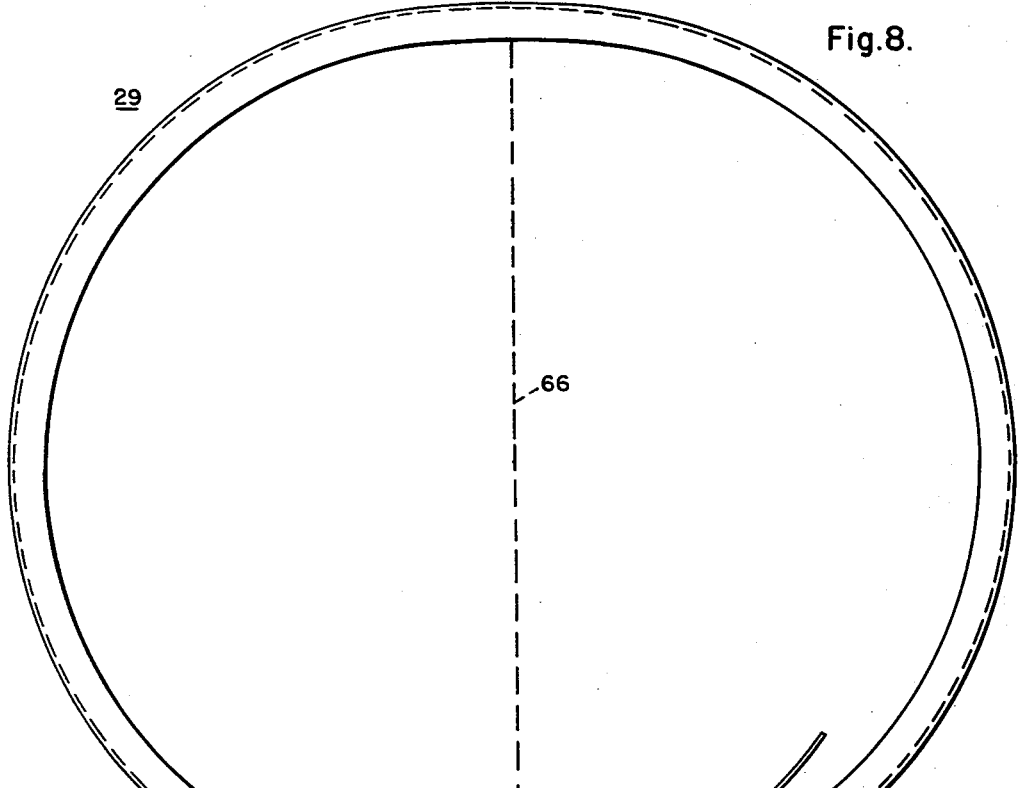
Fig. 8 is a plan view showing a desired configuration of the part of Fig. 2.

Although the teachings of the invention have many applications, the invention will be described in connection with an electrical meter assembly of the detachable type.

With reference to the drawings, there is illustrated in Fig. 1 an electrical meter assembly of the detachable type represented generally by the numeral 1. The assembly 1 includes cooperating cover and socket receptacles represented respectively by the numerals 3 and 5 adapted for detachable engagement relative to each other. The receptacles 3 and 5 are illustrated in Fig. 1 in the attached position.

The cover receptacle 3 includes a protective cover 7 secured to a base plate 9 by means of a rim 11 which engages portions of the cover 7 and the base plate 9. As illustrated in Fig. 1, the cover 7 is provided with a flange 13 adjacent the open end thereof and is preferably constructed of a transparent material, such as glass, to facilitate the inspection of a meter unit 15 which is carried by the base plate 9 and which is surrounded by the cover 7.

In order to provide electrical connections between an associated circuit and the meter unit 15, suitable contact blades 17 are electrically connected to the meter unit 15 and carried by the base plate 9 to project outwardly from the base plate as illustrated in Fig. 1. The base plate 9 may be constructed of any suitable material. If a metallic material is employed for the base plate, suitable insulation may be employed to insulate the contact blades 17 from the base plate 9.

The socket receptacle 5 includes an insulating member 19 for supporting a plurality of contact jaws 21 adapted to receive the contact blades 17 when the cover and socket receptacles 3 and 5 are in the attached position as shown in Fig. 1. Suitable line and load conductors (not shown) may enter the socket receptacle 5 through the threaded inlets 23 and 25 for connection to the contact blades 21. The socket receptacle 5 is provided with a flange 26 adjacent the open end thereof which is adapted to be positioned adjacent the flange 13 when the cover and socket receptacles 3 and 5 are in the attached position.

In order to provide a weather-proof seal and to retain the cover and socket receptacles 3 and 5 in the attached position, a suitable sealing ring assembly may be provided to circumferentially engage the flanges 13 and 26 of the cover and socket receptacles 3 and 5 when such receptacles are in the attached position. The association of a meter unit, cover receptacle, socket receptacle and sealing ring assembly is shown in the Bradshaw et al. Patent 1,969,499.

In accordance with the invention, a sealing ring assembly 27 is provided which is of two-part construction with the cooperating parts being illustrated in Figs. 2 and 3, and being represented generally by the numerals 29 and 30. Referring now to Fig. 2, the part 29 of the sealing ring assembly 27 is illustrated as comprising an elongated strip constructed of any suitable flexible material. Preferably, the strip is constructed of a resilient metallic material, such as aluminum, and is disposed in the form of a ring, as illustrated in Fig. 8. The strip may be formed in any desired manner, such as by stamping from a blank of the desired material a strip of the proper configuration and dimensions. The strip may then be deformed by any suitable operation to provide a ring having the configuration shown in Fig. 8.

As best shown in Fig. 2, the strip includes a pair of end portions 31 and 33 and a central portion 35. As illustrated, the strip is provided with spaced flanges 37 and 39 extending transversely of the strip to provide a channel of the strip for a purpose appearing hereinafter. It will be observed with reference to Fig. 2 that the flanges 37 and 39 terminate short of the end 33 of the strip at a point represented by the numeral 40, and that the end 33 has a width dimension which is slightly less than the width dimension of the remaining portion of the strip.

As illustrated in Fig. 2, the end 33 of the strip is provided with an elongated slot 41 which defines bridge portions 43 and 45 of the strip. The slot 41 has side walls 47 and 49 extending substantially parallel to the side edges of the strip. A plurality of projections 51, 53, 55, and 57 extend from the bridge portions 43 and 45 of the strip to substantially bridge the slot 41. As illustrated, the projections 51 and 55 are positioned adjacent one end of the slot 41 and extend respectively from the bridge portions 43 and 45 whereas the projections 53 and 57 are positioned adjacent the other end of the slot 41 and extend respectively from the bridge portions 43 and 45. As best shown in Fig. 6, each of the projections 51, 53, 55 and 57 is displaced from the plane defined by the strip to provide a cradle structure for receiving a portion of the part 30 of the sealing ring assembly 27 as will appear hereinafter. The projection 51 is provided with a width dimension which is somewhat greater than the width dimensions of the projections 53, 55 and 57 for a purpose appearing hereinafter.

It will be observed with reference to Fig. 2 that the side wall 47 of the slot 41 is serrated intermediate the projections 51 and 53 to provide a plurality of teeth 63 which are provided for the purpose of permitting locking engagement between the cooperating parts 29 and 30 of the sealing ring assembly 27 as will presently appear.

The strip 29 is provided with an additional elongated slot 65 which is positioned adjacent the end 31 of the strip. With the strip positioned as shown in Fig. 2, the slot 65 is substantially in vertical alignment with the slot 41 and is of narrower width than the slot 41. The strip is provided with a portion 67 which is displaced from the plane of the strip as shown in Fig. 5 and which extends from an end wall of the slot 65 to the adjacent terminal edge of the strip. A portion of the strip 29 is deformed to provide a downwardly extending projection 69 adjacent the end of the end portion 31 as shown in Fig. 8.

The strip is preferably disposed in the form of a ring, as illustrated in Fig. 8, and is proportioned to have the ends 31 and 33 in overlapping relation in a radial direction. In order to facilitate positioning of the ring assembly relative to the meter assembly 1 as will presently appear, the flexible ring preferably is provided with an oval configuration with the end portion 31 being spaced from the point 40 by a substantial distance. The radii of curvature of the end portions 31 and 33 are selected to be substantially equal to the radius of curvature of the meter assembly to permit tight engagement between the ends 31 and 33 and the meter assembly 1 when the ring assembly is in an operative position relative to the meter assembly. As shown in Fig. 8 the minor axis of the oval represented by the broken line 66 extends between the end 31 of the flexible ring and the point 40.

In order to retain the flexible ring in an operative position about the cooperating cover and socket receptacles 3 and 5, a locking part 30 is provided in accordance with the invention which is adapted for engagement with the flexible ring, and which includes a pair of integrally connected portions 75 and 81.

As best shown in Fig. 4, the portion 75 is in the form of an elongated strip having a central part 76 and a pair of enlarged end parts 71 and 73 which are displaced from the central part 76 in the manner shown in Fig. 4. Dimensions of the central part 76 are selected to permit positioning thereof within the slot 41 of the flexible ring when the flexible ring and locking part 30 are assembled relative to each other. Preferably, the central part 76 has an arcuate configuration with a radius of curvature substantially equal to the radius of curvature of the end 33 of the flexible ring so that the part 76 conforms to the curvature of the flexible ring when operatively associated therewith. The overall length dimension of the portion 75 is selected to be slightly greater than the length of the slot 41 to permit extension of the ends 71 and 73 beyond the end walls of the slot 41 into engagement with surfaces of the flexible ring adjacent such end walls. As will presently appear, the portion 75 of the part 30 is preferably constructed of a resilient and deformable material.

It is observed with reference to Fig. 3 that the portion 75 is provided with side edges 77 and 79 with the edge 77 being serrated to provide a plurality of teeth 84 adapted to cooperate with the teeth 63 when the flexible ring and the locking part 30 are assembled relative to each other as explained more fully hereinafter. In order to facilitate assembly of the parts 29 and 30 the part 30 is provided with an edge 80 adjacent the end 73 which is displaced from the plane of the edge 77. The locking part 30 includes an additional portion 81 which extends from the convex surface of the arcuate portion 75 in a direction substantially transverse to such surface. As will presently appear, the portion 81 is proportioned to extend through the slot 65 of the strip 29.

The locking part 30 is preferably constructed of the same material employed in the construction of the strip 29. The part 30 may be constructed in any suitable manner. For example, a part may be stamped from a sheet of the desired material to conform to the configuration of the part 30 with the portions 75 and 81 lying in a common plane. The part may then be deformed to effect positioning of the portions 75 and 81 relative to each other as shown in Figs. 3 and 4, and to provide the proper curvature of the portion 75.

Figure 9:
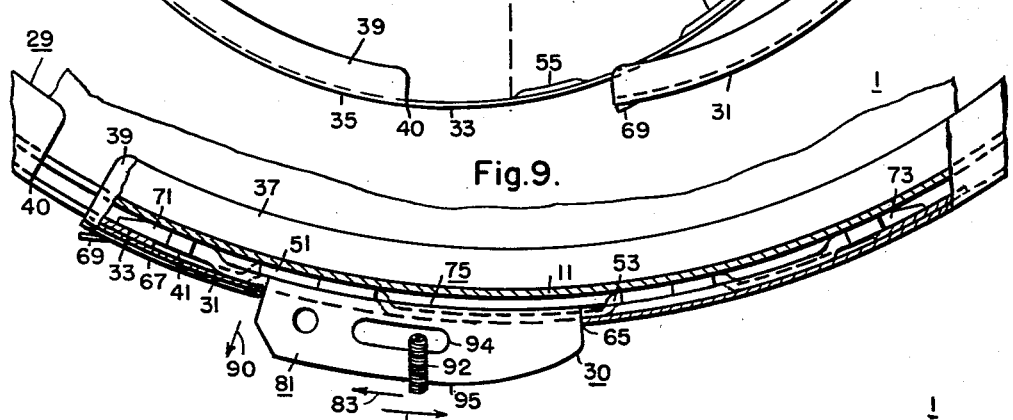
Fig. 9 is a view in side elevation with parts broken away of the sealing ring assembly in an operative position.

Preferably, the flexible ring and the locking part 30 are assembled to provide the sealing ring assembly 27 prior to positioning of the flexible ring relative to the meter assembly 1. The assembled sealing ring assembly 27 is illustrated in Fig. 9 in an operative position relative to the meter assembly 1. In order to assemble the part 30 and the flexible ring the part 30 is positioned with the portion 75 thereof substantially within the slot 41 of the flexible ring and with the ends 71 and 73 engaging surfaces of the flexible ring adjacent the end walls of the slot 41. It is observed that the portion 75 of the part 30 is positioned to substantially conform to the curvature of the flexible ring with the edge 77 adjacent the side wall 47 of the slot 41 to position the teeth 63 and the teeth 84 for engagement. In order to position the part 30 relative to the flexible ring in the manner described it is necessary to deform the resilient portion 75 of the part 30 to a slight degree.

Figure 10:
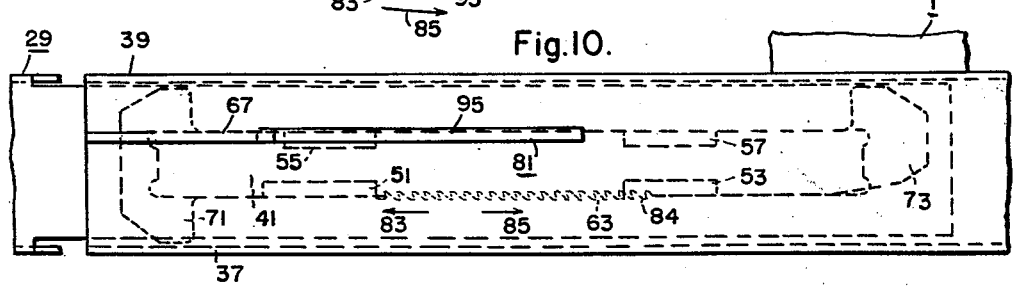
Fig. 10 is a view in top plan of the assembly of Fig. 9.

With such relative positioning of the flexible ring and the part 30 it is observed that the part 30 may be moved relative to the end 33 of the strip only in the circumferential direction indicated by the arrow 83 of Figs. 9 and 10. Such movement of the part 30 is made possible by reason of the construction of the teeth 63 and 84 and by reason of the resilient construction of the bridge portions 43 and 45. The teeth 63 and 84 are provided respectively with locking surfaces 87 and 89 and camming surfaces 91 and 93 with the camming surfaces being sloped to permit movement of the teeth 84 relative to the teeth 63 in the direction of the arrow 83, and with the slope of the locking surfaces being such as to prevent movement of the teeth 84 relative to the teeth 63 in the opposite direction as indicated by the arrow 85 of Figs. 9 and 10. The described camming action is facilitated by reason of the increased separation of the resilient bridge portions 43 and 45 caused by such camming action.

The ring assembly 27 is positioned relative to the meter assembly 1 as shown in Figs. 1 and 9 to have the flanges 13 and 26 of the cover and socket receptacles 3 and 5 within the channel defined by the flanges 37 and 39 of the flexible ring. The end 31 of the flexible ring is drawn over the portion 81 of the part 30 to have the portion 81 extend through the slot 65 of the end 31. Length dimensions of the slot 65 and the portion 81 are selected to prevent relative displacement between the portion 81 and the end 31 in circumferential direction indicated by the arrows 83 and 85.

In order to contract the ring assembly 27 about the meter assembly 1 it is only necessary to apply a force to the ring assembly acting between the ends 31 and 33 thereof in the direction indicated by the arrow 83. Conveniently, such a force is applied by simply squeezing the ring about the meter assembly 1, or by gripping the portion 81 of the part 30 and moving the part 30 together with the end 31 relative to the end 33 in the direction of the arrow 83. When the ring assembly is contracted about the meter assembly the locking surfaces 87 and 89 of the teeth 63 and 84 are in engagement to prevent relative displacement between the flexible ring and the part 30 in the direction for expanding the ring assembly.

It is noticed with reference to Fig. 9 that the projections 51, 53, 55 and 57 of the flexible ring engage the rim 11 of the meter assembly 1 when the ring assembly is contracted about the meter assembly. Such projections are effective to position the portion 75 of the part 30 within the slot 41. In addition, the projection 51 is proportioned and positioned to engage the end 71 of the part 30 in response to limited forced relative displacement between the part 30 and the end 33 in the circumferential direction indicated by the arrow 85. This is effective to prevent expansion of the ring assembly by unauthorized persons.

In order to release the ring from the contracted position, it is only necessary to effect relative displacement of the ends 31 and 33 in a direction radially of the ring assembly for separating the ends 31 and 33. This is conveniently accomplished by grasping the end 31 of the flexible ring and applying a force to the end 31 acting in the direction of the arrow 90 between the ends 31 and 33 for withdrawing the portion 81 of the part 30 from the slot 65 of the end 31. This action permits relative displacement between the ends 31 and 33 in the direction of the arrow 85 to expand the ring assembly. A suitable seal 92 may be provided which passes through the opening 94 of the portion 81 for preventing such displacement of the end 31 by unauthorized persons.

By reason of the resilient construction of the ring and the portion 75 of the part 30 it is possible to effect relative displacement between the part 30 and the end 33 of the flexible ring in the direction of the arrow 90. Such displacement is effective to cause disengagement of the teeth 63 and 84 to permit limited movement of the part 30 relative to the end 33 in the circumferential direction indicated by the arrow 85. Such arrangement facilitates the resetting of the part 30 relative to the end 33 when the ring assembly is removed from the meter assembly.

It will be recalled that the strip 29 and the locking part 30 are preferably constructed of the same metallic material. The purpose of this is to prevent corrosion of such engaging parts of the ring assembly 27. For the same reason, it is desirable that the rim 11 and the socket receptacle 5 be constructed of the same metallic material as is utilized in the manufacture of the strip 29 and the part 30 inasmuch as the rim 11 and the socket 5 include portions which engage the part 30 and the strip 29 when the ring assembly 27 is contracted about the meter assembly 1.

Since numerous changes may be made in the above described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a sealing device, a ring-shaped member having first and second ends, said first and second ends being provided respectively with first and second slots, and a locking member for positioning said ends, said locking member including first and second integral parts extending substantially transverse to each other, said first part having a curvature corresponding substantially to the curvature of said first end, said ring-shaped member being proportioned to mount said locking member with said first part substantially within said first slot to conform to the curvature of said first end, and with said second part extending through said second slot.

2. A device as defined in claim 1 wherein said first slot and said first part are proportioned to permit limited relative movement between the locking member and the first end only in a first circumferential direction, said second slot and said second part being proportioned to prevent relative movement between the locking member and the second end in circumferential directions, and to permit relative movement between the locking member and the second end in a direction transverse to the circumferential directions to release the second end for circumferential movement relative to the first end.

3. In a sealing device, a ring-shaped member having first and second ends provided respectively with first and second slots, said first end having a first serrated portion defining a side wall of said first slot, and a locking member for positioning said first and second ends, said locking member including first and second integral parts extending substantially transverse to each other, said first part having a curvature corresponding substantially to the curvature of said first end, said first part having a second serrated portion defining a side edge of said first part, said ring-shaped member being proportioned to mount the locking member with said first part substantially within said first slot to conform to the curvature of said first end to have said first and second serrated portions in engagement, and with said second part extending through said second slot.

4. A device as defined in claim 3 wherein said first and second serrated portions are proportioned to permit limited relative movement between the locking member and the first end only in a first circumferential direction, said second slot and said second part being proportioned to prevent relative movement between the locking member and the second end in circumferential directions, and to permit relative movement between the locking member and the second end in a direction transverse to the circumferential directions to release the second end for circumferential movement relative to the first end.

5. A device as defined in claim 4 wherein said first end and said first part have engageable parts positioned for engagement in response to limited forced relative movement between the locking member and the first end in a second circumferential direction opposite to said first circumferential direction for preventing substantial forced relative movement between the locking member and the first end in said second direction.

6. In a sealing device, a resilient ring-shaped member having first and second ends, and a locking member for positioning said ends, said ring-shaped member including integral means for detachably mounting the locking member to said first end, said locking member and said first end having first interfitting parts adapted for engagement to permit limited relative movement between the locking member and the first end only in a first circumferential direction, said locking member and said second end having second interfitting parts adapted for engagement to substantially prevent relative movement between the locking member and the second end in circumferential directions, said second interfitting parts being adapted for disengagement in response to deformation of the ring-shaped member within the elastic limit thereof to release the second end for circumferential movement relative to the first end, said first interfitting parts being adapted for disengagement in response to deformation of the first end within the elastic limit thereof to permit limited relative movement between the locking member and the first end in a second circumferential direction oposite to the first circumferential direction.

7. In a sealing device, a resilient ring-shaped member having first and second ends provided respectively with first and second slots, said first slot defining a pair of spaced flexible side portions of said first end, one of said side portions having a first serrated edge defining a side wall of the first slot, and a locking member for positioning said first and second ends, said locking member including first and second integral parts extending substantially transverse to each other, said first part having a second serrated edge, said ring-shaped member including integral parts for detachably mounting the locking member with said first part within said first slot to have said first and second serrated edges in engagement, and to have said second part extend through said second slot, said first and second serrated edges being engageable to permit limited relative movement between the locking member and the first end only in a first circumferential direction, and being disengageable in response to flexure of said flexible side portions within the elastic limit thereof to permit limited relative movement between the locking member and the first end in a second circumferential direction opposite to the first circumferential direction, said second slot and said second part being engageable to substantially prevent relative movement between the locking member and the second end in circumferential directions, and being disengageable in response to deformation of the ring-shaped member within the elastic limit thereof to permit relative movement between the locking member and the second end in circumferential directions.

8. In a sealing device, a resilient ring-shaped member having first and second ends provided respectively with first and second slots, said ring-shaped member being proportioned to have said first and second ends overlap in a radial direction with said first end positioned nearer to the ring center than said second end to have said first and second slots substantially in radial alignment, said first slot defining a pair of spaced flexible side portions of said first end, one of said side portions having a first serrated edge defining a side wall of the first slot, and a locking member for positioning said first and second ends, said locking member including first and second integral parts extending substantially transverse to each other, said first part having a second serrated edge, said ring-shaped member including integral parts for detachably mounting the locking member with said first part within said first slot to have said first and second serrated edges in engagement, and to have said second part extend through said second slot, said first and second serrated edges being engageable to permit limited relative movement between the locking member and the first end only in a first circumferential direction, and being disengageable in response to flexure of said flexible side portions within the elastic limit thereof to permit limited relative movement between the locking member and the first end in a second circumferential direction opposite to the first circumferential direction, said second slot and said second part being engageable to substantially prevent relative movement between the locking member and the second end in circumferential directions, and being disengageable in response to deformation of the ring-shaped member within the elastic limit thereof to permit relative movement between the locking member and the second end in circumferential directions.

9. In a sealing device, a ring-shaped member having first and second ends, and a locking member for positioning said ends, said locking member and said first end having first interfitting parts adapted for engagement to permit limited relative movement between the locking member and the first end only in a first circumferential direction, said locking member and said second end having second interfitting parts adapted for engagement to substantially prevent relative movement between the locking member and the second end in circumferential directions, said second interfitting parts being proportioned for disengagement in response to relative displacement between said first and second ends in a direction different from the circumferential directions to release the second end for circumferential movement relative to the first end.

10. In a sealing device, a ring-shaped member having a first end portion and a second end portion of reduced width with a pair of spaced flanges extending from said first end portion to said portion of reduced width to define a channel, each of said end portions having a separate slot, the slot of said first end portion having a serrated side wall, said ring-shaped member being proportioned to have said first and second end portions overlap in a radial direction with said first end portion within said channel to have said slots substantially in radial alignment, and a locking member for positioning said end portions, said locking member having first and second integral parts extending substantially transverse to each other, said first part having a serrated edge, said ring-shaped member including a plurality of spaced integral portions extending into the slot of the first end portion, said integral portions defining a cradle structure for supporting said locking part with said first integral part within the slot of the first end portion to have said serrated edge in engagement with said serrated side wall, and with said second integral part extending through the slot of the second end portion.

11. In a sealing device, a flexible ring having first and second ends, and a locking member for positioning said ends, said ring being proportioned to mount the locking member to said first end for limited adjustment relative to the first end about the axis of the ring, said locking member and said second end being proportioned for engagement from spaced positions to prevent relative movement between the locking member and the second end about the axis of the ring.

12. A device as defined in claim 11 wherein said first end is conditioned to permit installation and removal of the locking member relative thereto in response to flexure of the first end within the elastic limit thereof.

13. In a sealing device, a ring-shaped member having first and second ends, and a locking member for positioning said ends, said locking member and said first end having first interfitting parts permitting limited relative movement between the locking member and the first end only in a first circumferential direction, said locking member and said second end having second interfitting parts substantially preventing relative movement between the locking member and the second end in circumferential directions, said second interfitting parts permitting relative movement between the locking member and the second end in a direction different from the circumferential directions to release the second end for circumferential movement relative to the first end, said locking member and said first end being relatively displaceable in a direction different from the circumferential directions to permit limited relative movement between the locking member and the first end in a second circumferential direction opposite to the first circumferential direction.

14. In a sealing device, a ring-shaped member having first and second ends, and a locking member for positioning said ends, said locking member including first and second integral transverse parts, said first part having a curvature corresponding substantially to the curvature of said first end adapted to engage the first end for permitting limited relative movement between the locking member and the first end only in a first circumferential direction, said second part being adapted to engage the second end to substantially prevent relative movement between the locking member and the second end in circumferential directions, but permitting relative movement between the locking member and the second end in a direction different from the circumferential directions to release the second end for circumferential movement relative to the first end.

References Cited in the file of this patent

UNITED STATES PATENTS

| | | |
|---|---|---|
| 1,263,232 | Grinden | Apr. 16, 1918 |
| 1,969,499 | Bradshaw | Aug. 7, 1934 |
| 2,283,339 | Phillips | May 19, 1942 |

FOREIGN PATENTS

| | | |
|---|---|---|
| 118,308 | Switzerland | Mar. 16, 1937 |